United States Patent [19]

Kujawski et al.

[11] Patent Number: 5,785,358
[45] Date of Patent: *Jul. 28, 1998

[54] CONNECTION VERIFIER FOR A QUICK CONNECTOR COUPLING

[75] Inventors: Rick A. Kujawski, Macomb; Stephen H. Gunderson, Marine City, both of Mich.

[73] Assignee: Bundy Corporation, Warren, Mich.

[*] Notice: The term of this patent shall not extend beyond the expiration date of Pat. No. 5,499,848.

[21] Appl. No.: 614,364

[22] Filed: Mar. 12, 1996

Related U.S. Application Data

[63] Continuation-in-part of Ser. No. 312,457, Sep. 26, 1994, Pat. No. 5,499,848.
[51] Int. Cl.[6] ................................................ F16L 35/00
[52] U.S. Cl. ..................................... 285/93; 285/319
[58] Field of Search ........................ 285/319, 93, 921

[56] References Cited

U.S. PATENT DOCUMENTS

| 4,793,637 | 12/1988 | Laipply et al. | 285/93 |
| 4,964,658 | 10/1990 | Usui et al. | 285/93 |
| 5,178,424 | 1/1993 | Klinger | 285/93 |
| 5,342,099 | 8/1994 | Bahner | 285/93 |
| 5,425,556 | 6/1995 | Szabo | 285/93 |
| 5,441,313 | 8/1995 | Kalahasthy | 285/93 |
| 5,499,848 | 3/1996 | Kujawski | 285/93 |
| 5,518,276 | 5/1996 | Gunderson | 285/93 |

*Primary Examiner*—Eric K. Nicholson
*Attorney, Agent, or Firm*—Dorn, McEachran, Jambor & Keating

[57] ABSTRACT

A quick connector coupling for a fluid line includes a hollow female connector body defining an interior radial bearing surface. A male member has a radially enlarged upset and is insertable into the connector body to a first position and withdrawable from the first position to a second position within the connector body. A retainer is disposed in the connector body and has retention beams extending between the upset and the bearing surface to secure the retainer and the male member in the connector body. A ring-shaped indicator member is detachably secured to one end of the connector body. Withdrawal of the male member from the first position to the second position causes detachment of the indicator member from the connector body and signals a proper coupling.

9 Claims, 3 Drawing Sheets

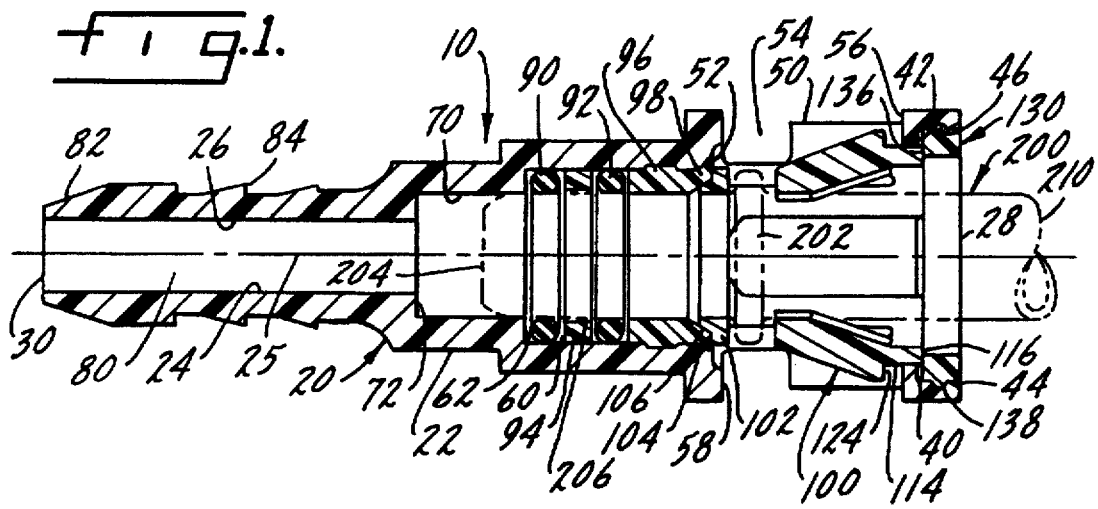
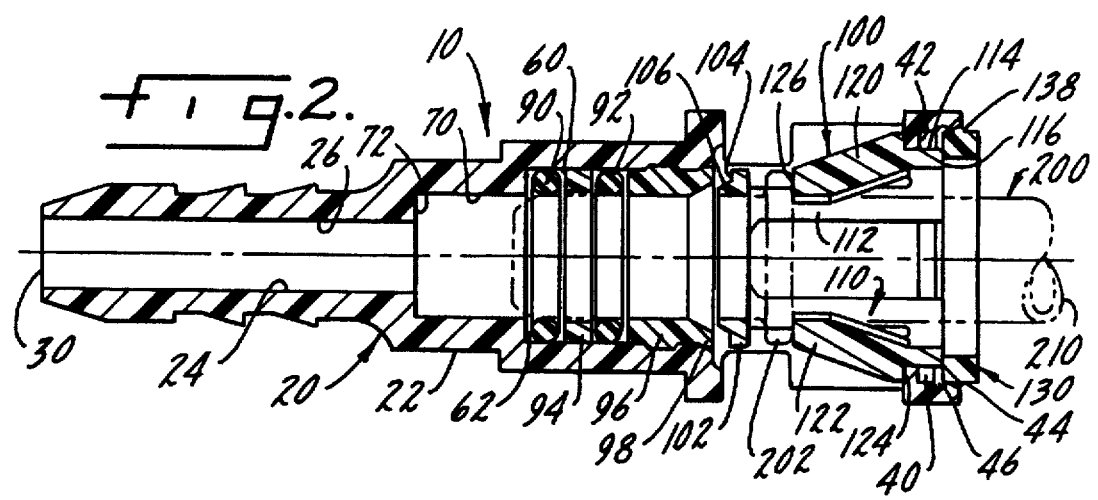
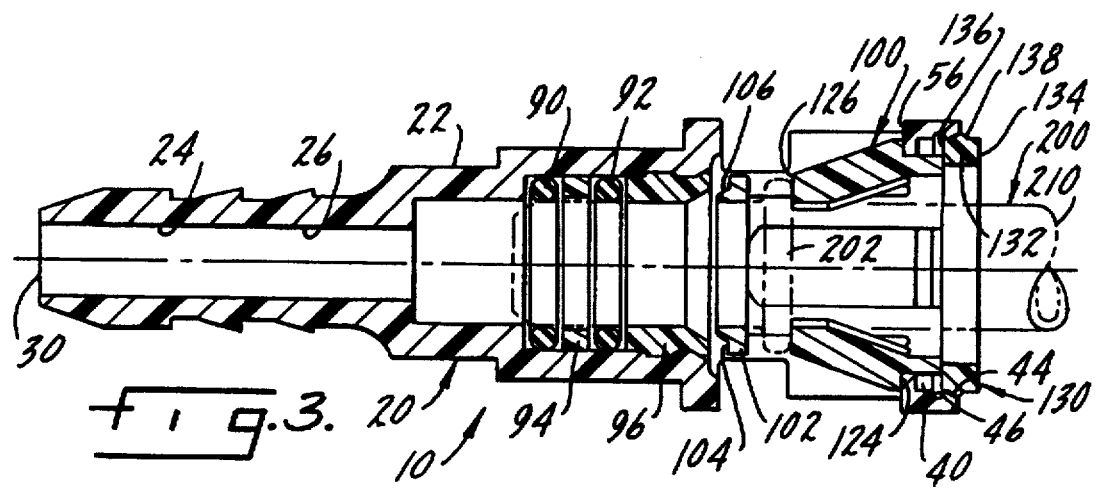

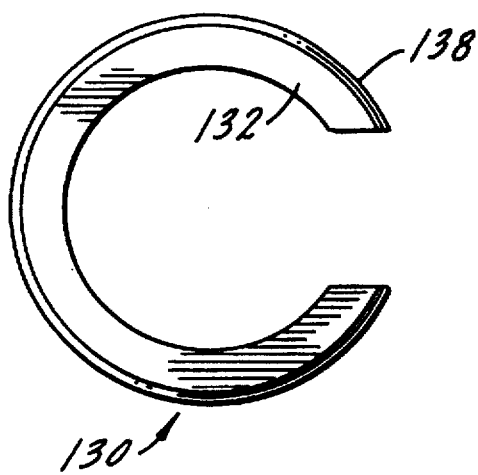
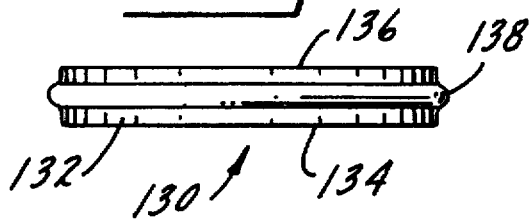
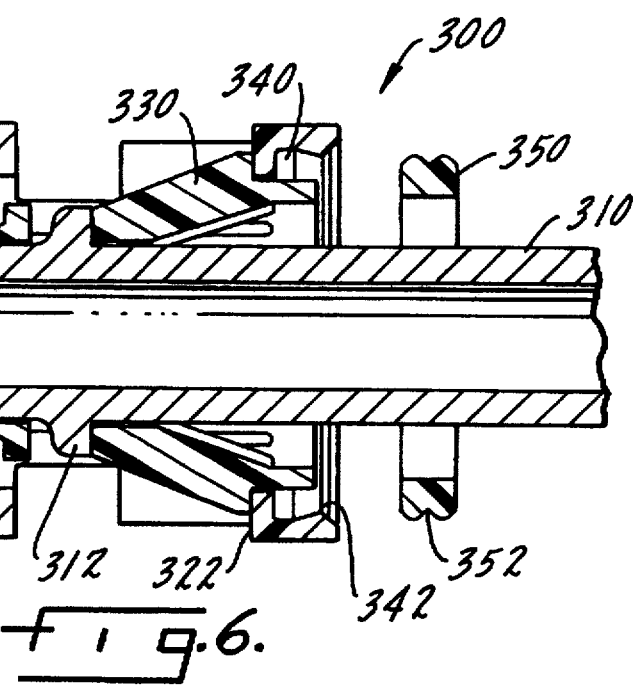

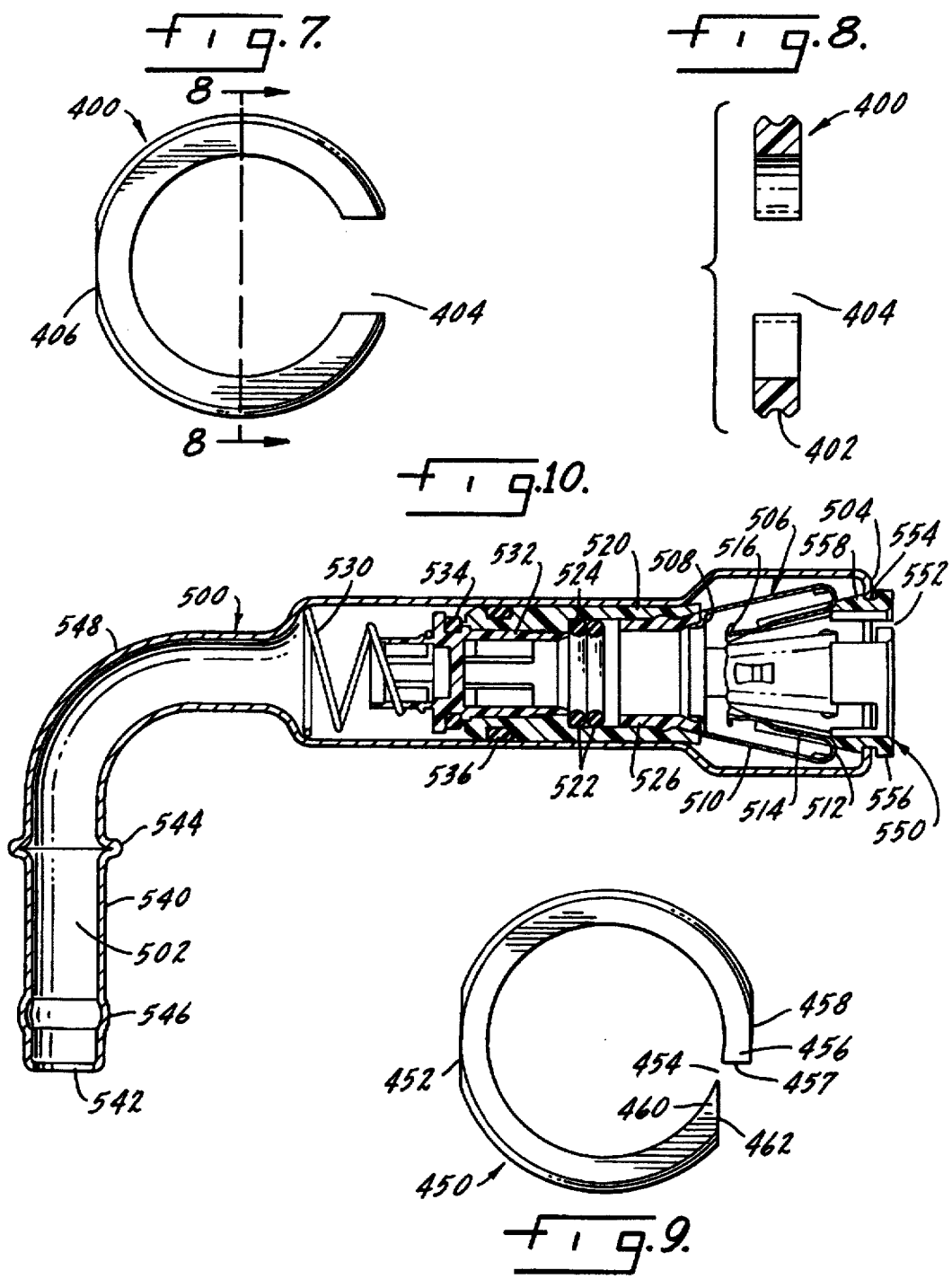

CONNECTION VERIFIER FOR A QUICK CONNECTOR COUPLING

BACKGROUND OF THE INVENTION

This is a continuation-in-part of U.S. patent application Ser. No. 08/312,457, filed on Sep. 26, 1994 now U.S. Pat. No. 5,499,848.

This invention relates to fluid line systems which include quick connector couplings, and more particularly to a quick connector coupling having means to provide a visual indication that a proper connection has been made between the male and female portions of the quick connector.

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

An improper or incomplete connection between the male member and female connector body of a quick connector coupling can have deleterious effects on the fluid line system. At the very least, a leak in the fluid system will occur at the site of the improper connection. More serious and potentially dangerous consequences can result if the fluid is pressurized, as many fluids in automotive systems are. Thus, a reliable and accurate means for verifying that a proper connection has been established between the male member and female connector body is desirable.

One way to check for a proper connection is to physically tug or pull on the male member in a direction away from the connector body. An improper connection is obvious if the male member withdraws from the female connector body.

Reliance on this method of connection verification has numerous disadvantages. The pulling or tugging force exerted on the male member to check for a proper connection may be insufficient to withdraw a partially connected male member from the connector body, leading to an erroneous perception of a proper connection. Another problem associated with sole reliance on physical inspection is that no indication or verification is left behind to signal to others that the coupling has in fact been inspected and has been found to be proper.

It is sometimes possible to audibly verify a proper connection. Typically, as the male member is inserted into the female connector body, an audible "click" is heard when the male member locks into place. The click results from resilient retention beams of a retainer contained within the female connector body snapping into place behind an enlarged diameter upset portion formed on the male member. This method of verification is also deficient in several respects. The click may be very quiet or inaudible, making its detection difficult. The material from which the retainer is manufactured may affect the audibility of the resulting click. Background noise in the workplace can make the task even more difficult. And, of course, an audio method of verification is inherently limited by the installer's hearing perception.

Generally, methods of connection verification which employ a visual indication of a proper connection have proven to be the most reliable.

In one common type of visual connection indicator, the position of the indicator relative to a female connector body is indicative of whether there has been a proper connection. Usually, the indicator is associated with the connector body and experiences a change in position relative to the connector body caused by inward movement, or insertion, of the male member. The indicator is not detached from the connector body, rather, the position of the indicator relative to the connector body is changed. Examples of this first type of visual indicator are found in U.S. Pat. Nos. 5,228,728, 5,226,679, 4,948,176, 4,925,217, 4,913,467, 4,895,396, 4,793,637 and 4,753,458.

A second type of visual connection indicator signals a proper connection by complete detachment of the indicator from the coupling. Detachment is effected by inward movement, or insertion, of the male member. Thus, the absence of the indicator signals a proper connection. Examples of this second type of visual indicator are found in U.S. Pat. Nos. 5,152,555, 4,946,205 and 4,915,240.

A third type of visual connection indicator is similar to the second type of visual indicator in that inward movement, or insertion, of a male member effects detachment of an indicator from a connector body. It differs, however, in that the detachable indicator, often a ring-shaped element, is retained, but freely movable, on the male member after detachment from the connector body. Thus, the presence of the indicator on the tube on which the male member is formed indicates a proper connection. Examples of this third type of visual indicator are found in U.S. Pat. Nos. 5,297,818 and 5,178,424.

These three types of visual connection indicators share a common trait: reliance on inward movement, or insertion, of the male member to alter the position of, or detach, the indicator, and to carry the male member to a locked position. Reliance on inward, or insertion, force to both move the male member to a locked position and to activate the indicator can be problematic. Erratic, careless or overly forceful insertion of the male member can cause activation of the indicator without formation of a proper connection, or conversely, formation of a proper connection without activation of the indicator.

A need exists for a visual connection indicator that utilizes separate motions, or forces, for moving the male member to a properly connected position, and for activating the connection verification mechanism.

SUMMARY OF THE INVENTION

The present invention provides a connection verification mechanism for a quick connector coupling that is activatable only after a proper coupling has been achieved, and only by application of an outward, or pull-back, force on the male member portion of the coupling.

The quick connector coupling of the present invention comprises a hollow female connector body, a male member received in the connector body that has a radially enlarged upset, a retainer associated with the connector body that is contactable with the upset to retain the male member in the connector body, and an indicator associated with the connector body that is selectively movable to indicate whether the male member is retained in the connector body.

The male member is movable relative to the connector body in a first direction to a locked position. In the locked position, contact between the retainer and the upset retains the male member in the connector body. The indicator is fixed relative to the connector body during movement to the locked position, and remains fixed upon attainment of the locked position.

The male member is movable from the locked position, in a second direction, to a verification position. In the verification position, contact between the upset and the retainer continues to retain the male member in the connector body. The indicator moves relative to the connector body during the transition from the locked position to the verification position to indicate a proper coupling.

BRIEF DESCRIPTION OF THE DRAWINGS

FIG. 1 is a partial sectional view of a quick connector coupling, in a state prior to connection verification, which embodies the present invention;

FIG. 2 is a partial sectional view of the coupling of FIG. 1, in a state during connection verification;

FIG. 3 is a partial sectional view of the coupling of FIG. 1, in a state after connection verification;

FIG. 4 is an enlarged front elevation view of the connection indicator member of the coupling of FIGS. 1–3;

FIG. 5 is an enlarged top plan view of the connection indicator member of FIG. 4;

FIG. 6 is a partial sectional view of a quick connector coupling utilizing a modified connection verification arrangement;

FIG. 7 is an enlarged front elevation view of a third embodiment of a connection indicator member;

FIG. 8 is a sectional view of the connection indicator member of FIG. 7, taken through lines 8—8;

FIG. 9 is an enlarged front elevation view of a fourth embodiment of a connection indicator member; and FIG. 10 is a sectional view of a metal female connector body having a connection verification mechanism according to the present invention.

DETAILED DESCRIPTION OF THE PREFERRED EMBODIMENTS

A quick connector coupling formed in a fluid line system is designated as 10 in FIGS. 1–3. Quick connector coupling 10 is comprised of a generally cylindrical female connector body 20 and a male member 200. Male member 200 is formed at an end of a hollow tube 210 which forms a part of a fluid line system. In use, female connector body 20 is, in turn, connected to flexible tubing or hose (not shown) which is also a part of the fluid line system. Female connector body 20 and male member 200 are connectable to form a permanent, but severable, joint in the fluid line.

Female connector body 20 is defined by a generally cylindrical, stepped exterior wall 22 and a generally cylindrical, stepped interior wall 24. Connector body 20 is centered about an axis 25, and is preferably made of a plastic material, such as nylon-12. Interior wall 24 defines a bore 26. Bore 26 extends completely through connector body 20, from a larger diameter, male member reception end 28 to a smaller diameter, hose connection end 30.

Description of this invention necessarily involves description of the relative positioning and/or movement of various elements of the coupling. Throughout this specification and the claims which follow, the terms "inward" or "insertion" denote an axial movement, or relative position, away from male member reception end 28 and towards hose connection end 30. The terms "outward" or "pull-back" denote an axial movement, or relative position, towards male member reception end 28 and away from hose connection end 30. Hence, "inward movement", or "insertion", of the male member denotes male member movement towards the hose connection end of the connector body, whereas an indicator member that is positioned "outward" of a retainer is positioned closer to the male member reception end of the connector body than is the retainer.

Variations in the diameter of interior wall 24 of connector body 20 divide bore 26 into five distinct sections. Moving inward from male member reception end 28, they are: indicator pocket 40, retainer chamber 50, seal chamber 60, tube end receptacle 70, and fluid passageway 80.

Indicator pocket 40 is formed adjacent male member reception end 28. It is defined by a large diameter portion of cylindrical interior wall 24 which extends inward from end 28 to a radial shoulder 42. Radial shoulder 42 faces end 28. Pocket 40 is further characterized by a chamfer 44 formed in wall 24 immediately adjacent end 28, and an annular groove 46 formed in wall 24 between shoulder 42 and end 28.

Retainer chamber 50 is formed inward of indicator pocket 40. It is defined by a reduced diameter portion of interior wall 24, relative to pocket 40, that extends inward from the small diameter end of radial shoulder 42 to a conical shoulder 52. The large diameter end of conical shoulder 52 is proximate retainer chamber 50, and the smaller diameter end of shoulder 52 is proximate seal chamber 60.

Retainer chamber 50 is also characterized by two opposing, axially aligned, rectangular windows 54 formed through connector body 20. Windows 54 define a pair of radial bearing surfaces 56 extending between exterior wall 22 and interior wall 24 which face hose connection end 30, and a pair of radial surfaces 58 which face reception end 28. Windows 54 also provide exterior access to retainer chamber 50, and facilitate use of a suitable tool to extricate a retainer from the retainer chamber.

Seal chamber 60 is formed inward of retainer chamber 50. It is defined by a reduced diameter portion of wall 24, relative to retainer chamber 50, extending inward from the small diameter end of conical shoulder 52 to a radial shoulder 62.

Tube end receptacle 70 is formed inward of seal chamber 60. It is defined by a reduced diameter portion of wall 24, relative to seal chamber 60, which extends inward from the small diameter end of radial shoulder 62 to a radial shoulder 72.

Fluid passageway 80 is defined by the smallest diameter portion of interior wall 24. It leads from the small diameter end of radial shoulder 72 to hose connection end 30. The portion of exterior wall 22 surrounding fluid passage chamber 80 is configured to facilitate connection to another component in the fluid line. The illustrated connector body 20, for example, is specially formed for connection to a flexible hose. A tapered nose 82 is formed adjacent end 30 to facilitate insertion into a flexible hose and barbs 84 are formed to assist in retention of the hose on the connector body. Alternative exterior configurations could be employed for connection to other system arrangements. For example, threads could be formed in exterior wall 22 to facilitate connection within a threaded bore of a housing containing a system component.

Male member 200, typically formed at the end of a rigid tube 210, is received in connector body 20. It includes a radially enlarged upset 202 formed a given distance from an open tube end 204. Upset 202 defines a bearing surface for contact with retention beams 120 of retainer 100, to be described herein. Tube end 204 is typically rounded or tapered to make insertion of male member 200 into connector body 20 less difficult. A smooth, cylindrical sealing surface 206 extends between upset 202 and tube end 204. The outer diameter of the non-upset portions of male member 200 should be such that the end of male member 200 fits snugly within tube end receptacle 70.

Disposed within seal chamber 60 are O-ring seals 90 and 92 separated by a spacer ring 94. Typically, O-ring 90 is made of a fluorocarbon/fluorosilicone blend and O-ring 92 is made of toughened fluorosilicone. Spacer ring 94 is made of a rigid material, such as plastic. The O-rings should be sized to fit tightly within seal chamber 60 and tightly around sealing surface 206 of male member 200.

O-rings 90 and 92 and spacer ring 94 are positioned and secured in seal chamber 60 by a spacer sleeve 96. Spacer sleeve 96 has a conically enlarged end 98 which seats against conical shoulder 52 of interior wall 24, positioning sleeve 96 within bore 26. Like spacer ring 94, spacer sleeve 96 is made of a rigid material, such as plastic. To provide enhanced securement of spacer sleeve 96 within bore 26, a raised annular portion may be formed in the outer periphery of sleeve 96, and a corresponding annular recess formed in interior wall 24. The raised spacer portion is matingly received in the recess formed in interior wall 24 to lock sleeve 96 into place.

Spacer sleeve 96 performs several important functions. It retains the seal elements within seal chamber 60 in a relatively fixed position and prevents their escape from bore 26. Also, the inner diameter of sleeve 96 approximates the outer diameter of male member 200, minimizing potentially debilitating radial movement of male member 200 relative to connector body 20. Finally, spacer sleeve 96 limits inward movement of retainer 100 (described below), which, in turn, limits inward movement of male member 200.

Retainer 100, preferably made of a flexible plastic, is disposed within retainer chamber 50. It is comprised of two retention beam support structures 110 extending outward from a base 102.

Base 102 is positioned immediately outward of spacer sleeve 96. It has a central annular opening with a diameter slightly greater than the outer diameter of male member cylindrical sealing surface 206, but less than the diameter of male member upset 202. Thus, sealing surface 206 can pass through base 102, but upset 202 cannot. Base 102 defines a radial abutment surface 104 that faces end 98 of spacer sleeve 96. Abutment of surface 104 against sleeve end 98 limits inward movement of retainer 100. Since male member upset 202 cannot pass through base 102, the contact between surface 104 and sleeve end 98 ultimately establishes a maximum limit to insertion of male member 200 into connector body 20.

A relatively short annular flange 106 extends inward from the inner periphery of retainer base 102. The recess defined by conically enlarged end 98 of spacer sleeve 96 receives flange 106 when base 102 is pressed against sleeve 96. Flange 106 has an inner diameter approximating the outer diameter of male member sealing surface 206, providing radial stability of base 102 about male member 200.

Retention beam support structures 110 are integrally joined to, and extend outward from, retainer base 102. Each support structure 110 includes two parallel support beams 112 extending from base 102 towards male member reception end 28. Support beams 112 are joined at their ends distal from base 102 by a semi-circular cross beam 114. When base 102 is in contact with spacer sleeve 96, outer surface 116 of cross beam 114 extends outward of shoulder 42 and slightly into indicator pocket 40.

A retention beam 120 is centrally mounted on each cross beam 114, straddled by support beams 112. Retention beams 120 extend inwardly from cross beams 114 at a converging angle, terminating in free ends 122. The radial spacing between free ends 122 is less than the diameter of male member upset 202. Thus, retention beams 120 must be forced radially outwardly to permit passage of upset 202. Retention beams 120 are flexible about their points of attachment to cross beams 114 to suit this purpose. The axial spacing between retention beam free ends 122 and retainer base 102 must be at least as great as the axial width of upset 202.

Each retention beam 120 is formed with two radial locking surfaces. Outwardly facing locking surfaces 124 are formed adjacent, and above, the points of attachment of retention beams 120 to cross beams 114. In use, locking surfaces 124 are engagable with radial bearing surfaces 56 of connector body 20 to prevent withdrawal of retainer 100 from bore 26. Inwardly facing locking surfaces 126 are formed at the free ends 122 of retention beams 120. Locking surfaces 126 are engagable with upset 202, after upset 202 has moved inward of retention beams 120, to prevent withdrawal of male member 200 from bore 26.

Retainer 100 is axially movable within bore 26 between a first, innermost position, and a second, outermost position. In the first position (shown in FIG. 1), abutment surface 104 of retainer base 102 contacts spacer end 98 to prevent further inward movement of retainer 100, and locking surface 124 is spaced from bearing surface 56. In the second position (shown in FIG. 3), locking surfaces 124 contact bearing surfaces 56 to prevent further outward movement of retainer 100, and retainer base 102 is spaced from spacer 96.

An connection indicator 130, in the form of a "C" shaped snap-ring, is disposed in indicator pocket 40. It is illustrated in greater detail in FIGS. 4 and 5.

Indicator 130 is formed of a rigid, yet flexible, material, such as plastic. It includes an annular "C" shaped body 132 extending axially between an outward radial edge 134 and an inward radial edge 136. A raised, annular ridge 138 surrounds body 132. As best seen in FIG. 5, ridge 138 is centrally located between body edges 134 and 136.

Indicator 130 has an outer diameter slightly greater than the inner diameter of pocket 40. Thus, it must be compressed slightly to fit into pocket 40. The "C" shape of indicator 130 permits this compression. Chamfer 44 eases, and actually assists in, achievement of the compression necessary to install indicator 130 in pocket 40.

Installation of indicator 130 is complete when its annular ridge 138 is matingly received in annular groove 46 formed in interior wall 24. The compressed state of indicator 130, in combination with the cooperation of groove 46 and ridge 138, results in a tight fit of indicator 130 within pocket 40. In this installed state, inward edge 136 of indicator 130 is spaced slightly outward of radial shoulder 42 and extends radially into bore 26 beyond the inner radial periphery of shoulder 42. Outer edge 116 of retainer cross beam 114 extends into pocket 40 a distance corresponding to the spacing between indicator edge 136 and shoulder 42. Thus retainer 100 contacts, but does not exert outward pressure on, indicator 130.

Assembly of coupling 10 includes two steps: a locking step, in which male member 200 is moved inwardly, or inserted, to a locked position; and a connection verification step, in which male member 200 is moved outwardly, or pulled-back, to effect detachment of indicator 130 from connector body 20.

Prior to initiation of the locking step, retainer 100 is in its first, innermost position. Retainer base surface 104 contacts spacer end 98, and outer edge 116 of retainer cross beam 114 contacts inward edge 136 of indicator 130.

Indicator 130 poses no resistance to male member insertion as its compressed inner diameter is greater than the diameter of upset 202. Resistance occurs when free ends 122 of retention beams 120, which have a radial spacing less than the diameter of upset 202, contact upset 202. Since beams 120 are flexible, impartment of sufficient inward force to male member 200 causes their outward flexure, and moves upset 202 inward of beams 120. Once this occurs, retention beams 120 relax and "snap" into place behind upset 202. Inwardly facing locking edges 126 prevent subsequent withdrawal of male member 200 from connector body 20. Male member 200 is in a locked position.

In the locked position, O-rings 90 and 92 form a fluid seal between sealing surface 206 of male member 200 and interior wall 24 of seal chamber 60. Also, tube end 204 extends partially into tube end receptacle 70.

The connection verification step is initiated after completion of the locking step. It consists of an outward movement of, or pull-back on, male member 200. This moves upset 202 outward until it contacts retainer beams 120. Resistance to outward movement of retainer 100 is provided by indicator 130, whose inward edge 136 abuts retainer cross beams 114. Application of sufficient outward force to male member 200 will, however, overcome the resistance of indicator 130, effecting outward movement of retainer 100 and eventual detachment of indicator 130 from connector body 120. The pull-back force required may be significant, however, due to the compressed, or spring-loaded, state of indicator 130. It may, in fact, be greater than the inward force necessary to move male member 200 to a locked position.

Indicator 130 is illustrated in FIG. 2, on the verge of detachment from connector body 20. Annular ridge 138 has nearly slid out of annular groove 46, and is approaching chamfer 44. Once ridge 138 clears groove 46 and encounters chamfer 44 (FIG. 3), indicator 130 rapidly expands to an uncompressed state. The stored spring force causes indicator 130 to spring away from, or "pop out" of, pocket 40 and become freely movable on tube 210, signaling a proper connection and completing the connection verification step. Bright or prominent coloration of indicator 130 may be desirable to aid in its visual detection.

After completion of the connection verification step, further outward movement of retainer 100 and male member 200 is prevented by the abutment of retention beam locking surfaces 124 against bearing surfaces 56 of connector body 20, and the abutment of retention beam locking surfaces 126 against male member upset 202.

The above described arrangement substantially reduces the potential for false indication of a proper connection. Pull back of an unlocked male member, that is, a male member whose upset is still outward of the retention beam free ends, will not effect detachment of the indicator. Since upset 202 is outward of retention beam free ends 122, outward movement of male member 200 imparts no outward force to retainer 100, which in turn, imparts no outward force to indicator 130. Hence, male member 200 withdraws from connector body 20 without causing detachment of indicator 130, signaling an improper connection. Erratic or violent insertion of male member 200 is also unlikely to effect accidental detachment of indicator 130 since a pull-back, rather than an insertion, force is required.

An alternative connection indicator arrangement is illustrated in FIG. 6. Coupling 300 is substantially the same as quick connector coupling 10 of FIGS. 1–3. It includes a male member 310 retained in a female connector body 320 by a retainer 330 having retention beams extending between an upset 312 formed on the male member and a radial bearing surface 322 defined in the connector body. The differences reside in the formation of indicator pocket 340 and indicator 350.

Indicator pocket 340 defines an annular ridge 342, as opposed to annular groove 46 formed in indicator pocket 40. Indicator 350, still in the form of a C-shaped ring, defines a complementary annular groove 352. Indicator 350 nests within pocket 340, with ridge 342 fitting into groove 352. As in the first embodiment coupling, outward movement of male member 310 causes outward movement of retainer 330, which pushes indicator 350 out of pocket 340 to indicate a proper connection.

A slightly modified third embodiment of a connection indicator ring 400 is illustrated in FIGS. 7 and 8. Indicator ring 400 is very similar to ring 350. It is a C-shaped ring defining an annular groove 402 about its outer circumference. A complementary ring of spaced ridges or protrusions defined inside an indicator pocket formed at the entrance to a connector body (see FIG. 6) fits into groove 402 when ring 400 is pressed into the indicator pocket. The outer diameter of indicator ring 400 is larger than the inner diameter of its mating indicator pocket. Therefore, in order for the ring to be pressed into the indicator pocket, it must be compressed. Gap 404 defined by the spaced ends of indicator ring 400 permits this compression.

Indicator ring 400 differs from the previously described indicator embodiments in that a flat 406 is formed on the outer circumference of ring 400 opposite gap 404. Since ring 400 is relatively thin at flat 406, the top and bottom halves of ring 400 are more easily compressed towards each other about flat 406, which acts as a pivot point. If the indicator pocket in the associated connector body were formed with a mating projection inside the pocket, flat 406 could also be useful to prevent relative rotation between the connector body and indicator ring.

Ring 400 is made of a blend of polyoxymethylene and glass, preferably 20% glass. The glass content provides rigidity to the indicator ring and prevents it from conforming, or "cold-flowing", to fit the connector body over extended periods of time.

As described with reference to previous embodiments, the ring is activated by inserting a mating male tube into the connector body to a locked position and then pulling back on the tube. Pull back on a locked male member causes the retainer inside the connector body to slide back and contact the ring. As pull back continues, the ring begins to contract as it moves against the mating protrusions in the indicator pocket. This combination of contraction and force pushing the ring out of body results in ejection of the ring and verification of a proper connection.

Yet another modified indicator ring 450 is illustrated in FIG. 9. It is very similar in form and function to ring 400, including the presence of a flat 452. It differs from ring 400 in that it more resembles a complete circle, with a smaller gap 454 opposite flat 452. Top terminal end 456 of ring 450 is elongated and extends over center to an axial edge 457. A flat 458 is defined on the outer circumference of top terminal end 456. Bottom terminal end 460 of ring 450 extends to a vertical edge 462 and at its topmost point, is spaced only slightly from top end 456. When ring 450 is compressed during installation into a connector body, top end axial edge 457 moves past bottom edge vertical edge 462, resulting in closure of gap 454.

FIG. 10 illustrates application of the connection verification concept to a metal connector body 500. The metal connector body itself does not form a part of the present invention and will be described only briefly. A full description of a similar metal connector body may be found in U.S. Pat. No. 5,485,982, which has common assignee with the present application.

Connector body 500 is hollow, defining a bore 502. Bore 502 extends into connector body 500 from an entrance rim 504. A metal retainer 506 is housed in an enlarged portion of connector body 500 adjacent entrance rim 504. Retainer 506 includes a hollow, annular base 508. Four support members 510 extend away from base 508 towards rim 504 to first bends 512. The spacing between opposing bends 512 is greater than the inside diameter of rim 504, preventing retainer 506 from being withdrawn from connector body 500. Retention members 514 continuous with support members 510 extend from first bends 512 back toward base 508 to second bends 516. The spacing between opposing bends 516 is less than the outside diameter of the upset of the male member to be inserted into connector body 500, such that once the upset has moved past bends 516, the male member is locked into the connector body.

An elongated sleeve 520 is fit into a medium-diameter portion of connector body 500. O-ring seals 522 are housed inside sleeve 520 between an interior sleeve shoulder 524 and a secondary sleeve 526 fit into sleeve 520. Sleeves 520 and 526 abut retainer base 508 and limit insertion of retainer 506 into connector body 500.

A spring-loaded check valve is disposed in the opposite end of sleeve 520. The check valve includes a spring 530 which presses a plunger 532 into sleeve 520. A square-ring seal 534 surrounding plunger 532 contacts the end of sleeve 520 and forms a fluid seal which prevents fluid flow through the connector when a male member has not been inserted. When a male member is inserted, it contacts plunger 532, pushing it out of sleeve 520 and thereby spacing seal 534 from sleeve 520 and permitting fluid flow. An additional O-ring seal 536 is disposed in a groove in the outer periphery of sleeve 520.

Beyond the check valve, a small-diameter tubing connection portion 540 of connector body 500 extends to an open end 542. Tubing connection portion 540 is configured to provide enhanced attachment of a flexible hose to the connector body. It includes a stop bump 544 and a bulge 546 which expands the flexible hose to provide enhanced gripping of the hose about the connector body. As illustrated, connector body 500 includes an elbow bend 548 between the check valve and tubing connection portion 540. It should be understood, of course, that connector body 500 could be configured as necessary to accommodate the environment in which it is situated.

Indicator ring 550 is detachably secured to entrance rim 504. Ring 550 is not completely circular; it includes a gap 552 to permit compression of the ring such that it may be fit into rim 504. An annular groove 554 defined in the exterior of ring 550 between a shoulder 556 and a ramped nose 558 mates with rim 504 to secure ring 550 to connector body 500.

Shoulder 556 has an outside diameter greater than that of the inside diameter of rim 504. Hence, ring 550 may not be inserted into connector body 500 beyond shoulder 556. Groove 554 has an out side diameter approximately equal to the inside diameter of rim 504. Ramped nose 558 has a greater diameter end adjacent groove 554 and a smaller diameter end remote from groove 554. The greater diameter end of nose 558 has an outside diameter exceeding the inside diameter of rim 504 and the smaller diameter end of nose 558 has an outside diameter less than the inside diameter of rim 504.

Installation of ring 550 is easily initiated, as ramped nose 558 has an initial diameter less than that of rim 554. As insertion of ring 550 into the end of connector body 500 proceeds, the inserted outside diameter of nose 558 gradually increases and nose 558 eventually contacts rim 554. Continued insertion compresses ring 550 as its outer ramped surface slides against rim 504. Once groove 554 is aligned with rim 504, the greater diameter portion of nose 558 expands in side connector body 500 behind rim 504, locking ring 550 into position.

Connection verification is accomplished in essentially the same manner as with previously described embodiments. A male member is inserted into connector body 500 to a locked position, that is, a position wherein the male upset is trapped between retainer base 508 and retainer bends 516. Once in the locked position, a pull back on the male member causes retainer 506 to also move back towards rim 504. Eventually, retainer 506 contacts ramped nose 558 of ring 550. Continued pull back on the male member causes the retainer to slide against the outside ramped surface of nose 558, compressing ring 550. When ring 550 is compressed to a point such that the greatest diameter portion of nose 558 equals the inside diameter of rim 504, the combination of ring compression with force pushing the ring out of body results in ejection of the ring and verification of a proper connection.

Various features of the present invention have been explained with reference to the embodiments shown and described. It must be understood, however, that modification may be made without departing from the spirit and scope of the invention.

The indicator member, for example, has been described as a ring-shaped member. This shape is advantageous in that after detachment the indicator is axially movable, but retained, on the male tube. Depending on the specific application and particular needs, however, the indicator may take other forms, with appropriate modifications to the connector body, and remain within the scope of this invention. It need not be ring shaped if retention on the male member is not desired. Furthermore, detachment from the connector body may not be necessary or desired at all. A pull-back motion effecting a change in position, but not complete detachment, of the indicator member may be sufficient, and even desirable, in some applications.

We claim:

1. A quick connector coupling comprising a connector body defining a first bearing surface; a male member insertable into said connector body and defining a second bearing surface; a retainer extending between said first and second bearing surfaces to secure said male member in said connector body after said male member has been inserted into said connector body to a predetermined position; and a connector verifier connected to said connector body and movable relative to said connector body on movement of said second bearing surface toward said first bearing surface only after said male member has reached said predetermined position.

2. A coupling as claimed in claim 1 wherein said connection verifier is detachably secured to an entrance to said connector body, and pull back on said male member after insertion of said male member to said predetermined position causes corresponding movement of said retainer, and said retainer contacts said connection verifier to detach it from said connector body.

3. A coupling as claimed in claim 2 wherein said entrance to said connector body has an inside diameter, and said connection verifier is a ring having a relaxed outside diameter greater than said inside diameter and a gap to permit compression of said ring inside of said entrance to said connector body.

4. A coupling as claimed in claim 3 wherein an annular groove is formed about an outer circumference of said ring, and a complementary protrusion defined inside of said entrance fits into said groove.

5. A coupling as claimed in claim 4 wherein a flat is formed on said outer circumference of said ring opposite said gap.

6. A coupling as claimed in claim 3 wherein said ring is made of a blend of polyoxymethylene and 20% glass.

7. A coupling as claimed in claim 3 wherein a top terminal end of said ring extends to an axial edge, and a bottom terminal end of said ring extends to a vertical edge, and said gap is closed during compression of said ring.

8. A coupling as claimed in claim 3 wherein said connector body is metal and defines a rim at said entrance, and said ring has a groove defined therein which receives said rim to detachably secure said ring to said connector body.

9. A coupling as claimed in claim 8 wherein a shoulder is formed on one side of said ring groove and has an outside diameter greater than an inside diameter of said rim, and a ramped nose is formed on an opposite side of said ring groove.

* * * * *